United States Patent [19]

Roba

[11] Patent Number: 4,816,050

[45] Date of Patent: Mar. 28, 1989

[54] PROCESS AND APPARATUS FOR MAKING OPTICAL-FIBER PREFORMS

[75] Inventor: Giacomo Roba, Cogoleto, Italy

[73] Assignee: Cselt - Centro Studi e Laboratori Telecomunicazioni S.p.A., Turin, Italy

[21] Appl. No.: 472,063

[22] Filed: Mar. 4, 1983

[30] Foreign Application Priority Data

Mar. 5, 1982 [IT] Italy .............................. 67257 A/82

[51] Int. Cl.$^4$ .......................................... C03B 37/018
[52] U.S. Cl. ..................................... 65/3.12; 65/3.11; 65/18.2; 65/161
[58] Field of Search ....................... 65/3.11, 3.12, 18.2, 65/29, 157, 158, 160, 161, 13; 55/319

[56] References Cited

U.S. PATENT DOCUMENTS

| 1,817,338 | 8/1931 | Baker | 55/319 |
| 4,162,904 | 7/1979 | Clay et al. | 55/319 |
| 4,165,224 | 8/1979 | Irven | 65/3.12 |
| 4,280,829 | 7/1981 | Sheth | 65/3.12 X |
| 4,314,837 | 2/1982 | Blankenship | 65/3.12 |
| 4,328,017 | 5/1982 | Buehl | 65/3.12 |
| 4,378,985 | 4/1983 | Powers | 65/3.12 |
| 4,389,229 | 6/1983 | Jang et al. | 65/3.12 |

FOREIGN PATENT DOCUMENTS 2140 1/1979 Japan ..................... 65/3.11

Primary Examiner—Arthur Kellogg
Attorney, Agent, or Firm—Herbert Dubno

[57] ABSTRACT

In order to prevent an uncontrolled collapse of a quartz tube whose inner surface is being coated with a vitrifiable substance in making a preform or parison of an optical fiber, one or more streams of carrier gas entraining the ingredients of the coating substance through the quartz tube are supplemented by a stream of supplemental carrier gas whose flow is being continuously controlled to keep the overall mass-flow rate substantially constant. The outer tube diameter is photoelectrically monitored and incipient changes thereof are compensated by controlling a flow of additional carrier or inert gas which does not pass through the tube but joins the traversing gas flow at the tube outlet, inside a solids separator with a restricted exit aperture, to modify the pressure differential across the tube wall.

8 Claims, 2 Drawing Sheets

PROCESS AND APPARATUS FOR MAKING OPTICAL-FIBER PREFORMS

FIELD OF THE INVENTION

My present invention relates to a process and an apparatus for making a preform or parison of vitreous material from which an optical fiber, of the type used in telecommunication, can be drawn.

BACKGROUND OF THE INVENTION

As is well known in the art, such preforms or parisons can be produced with the aid of a vitreous supporting tube—generally of quartz—which is internally coated with vitrifiable reactants formed by the technique known as chemical-vapor deposition (CVD). The reactants usually include a silicon halide, a germanium halide, an oxidant and one or more doping agents whose relative proportions can be varied during deposition in order to establish a desired refractive-index profile. These constituents interact at an elevated temperature whereupon the resulting structure is thermally collapsed to form a solid rod; the latter is subsequently vitrified unless such vitrification has already occurred at an earlier stage.

When the preform thus obtained is drawn into a fiber, the tube material constitutes the cladding while the deposited substance becomes the core. The internal deposit may consist of 50 to 100 layers whose formation may require about 4 to 8 hours; the deposition of each layer is accompanied by a relative axial displacement of an external heater which locally increases the temperature of the tube to insure a fusion of the core material over its entire length. Thus, the tube undergoes numerous thermal cycles subjecting it to considerable stress. The thermal shock so exerted upon the tube locally reduces its viscosity and, on account of the existing surface tension, tends to cause its partial collapse in a zone of intensive heating. The resulting reduction of the inner diameter of the tube entails an uncontrollable throttling of the gas flow traversing same and, therefore, a change in the concentration of the dopants which can manifest itself in a deviation of the refractive index of the fiber from the programmed value. Once this constriction surpasses a certain limit, the process degenerates and yields an optically unsatisfactory preform.

The problem referred to is particlarly serious when the ingredients of the reactive mixture are such as to require high operating temperatures, e.g. above 1600° C. Such high temperatures will be needed especially in the manufature of fibers that are to be used for signal transmission with wavelengths near the upper limit of the minimum-attenuation window lying in a range of 0.7 to 1.6$\mu$, e.g. with wavelengths above 1.3$\mu$. Typical preforms for such fibers include those of graded refractive-index profile having a cladding of undoped silica and a core with a binary $SiO_2/GeO_2$ matrix, operating with the lowest possible attenuation of 0.17 dB/Km for a wavelength of 1590 nm, as well as preforms of the monomode type with similar composition or with an $SiO_2$—F bond for the cladding and pure silica for the core.

OBJECTS OF THE INVENTION

Thus, an object of my present invention is to provide a process for making optical-fiber preforms which minimizes possible geometric deformations of the supporting tube and avoids inadmissible deviations of the refractive-index profile.

A related object is to provide an apparatus for carrying out this process.

SUMMARY OF THE INVENTION

In accordance with my present invention, the outer diameter of the supporting tube is maintained substantially constant by continuously controlling the flow of a treatment gas of the aforedescribed character through the tube during deposition of the vitrifiable material on its inner surface. This is accomplished by exhausting the spent treatment gap at a variable rate from an outlet end of the tube and, upon detecting an incipient change in the outer diameter thereof, modifying the exhaust rate to vary the gas pressure within the tube in a sense counteracting such incipient change.

In principle, the modification of the exhaust rate could be effected by controlling the operation of an aspirator coupled to the tube outlet. Such aspirators, however, have a certain inertia which may introduce an objectionable lag between the emission and the execution of a modification command. Pursuant to a more particular feature of my invention, therefore, the internal gas pressure of the tube is controlled by directing the spent treatment gas exiting from the tube outlet into a passage with a restricted exit aperture and admixing therewith a flow of additional gas whose supply rate is being modified to vary the exhaust rate. Such modification, performed with an adjustable throttle, becomes effective with only a minimum time lag and is therefore well suited to the purpose of virtually instantaneously counteracting a change in tube diameter due to temperature variations, especially in a zone momentarily exposed to the action of an external heater.

The spent gas exiting from the tube by way of the aforementioned passage will generally consist, essentially, of carrier gas entraining residual reactants in the form of comminuted solid particles. Advantageously, the exhaust-controlling passage provided with the restricted exit aperture also serves to separate these particles from the carrier gas. The additional gas introduced at a variable supply rate into that passage is preferably of the same composition as the carrier gas which in most cases will be either oxygen or an inert substance such as argon.

Since the proportion of dopants and other reactants in the fresh gas entering the supporting tube may be varied in a preprogrammed manner according to the desired refractive-index profile, pressure changes due to this variation in the gas composition should be avoided as far as possible. Thus, I prefer to provide a flow of supplemental gas free from accompanying reactants which is continuously admixed with the reactant-laden carrier gas upstream of the tube in a proportion keeping the overall mass-flow rate of the entering gas substantially constant. The supplemental gas may also be of the same composition as the carrier gas and may be obtained from the source of that carrier gas, e.g. from an oxygen tank, through a bypass as described in a commonly owned application, Ser. No. 390,801, filed by me jointly with Eros Modone on June 21, 1982, now U.S. Pat. No. 4,445,918. Any change in the overall mass-flow rate, however, will still have to be taken into account in modifying the exhaust rate to maintain the necessary pressure differential across the peripheral tube wall.

The conventional components of an apparatus for carrying out the process according to my invention include mounting means for holding the collapsible vitreous supporting tube, first conduit means for introducing a flow of carrier gas laden with vitrifiable reactants in vaporized form into the tube for deposition of these reactants in successive layers on its inner wall surface, heating means for bringing the reactants in the tube to an elevated interaction temperature, second conduit means connected to an outlet end of the tube, and exhaust means coupled with the latter conduit means for extracting spent treatment gas from the tube. In accordance with my present invention, the apparatus further comprises a chamber inserted between the second conduit means and the exhaust means, third conduit means connecting a source of a flow of additional gas to the chamber, monitoring means juxtaposed with the mounting means for detecting incipient changes in the outer tube diameter, and flow-control means in the third conduit means responsive to signals from the monitoring means for varying the flow rate of the additional gas which leaves the chamber together with the spent treatment gas from the tube via a restricted exit aperture leading to the exhaust means. Thus, variations in the flow rate of the additional gas will have the aforedescribed effect of modifying the rate of extraction of the spent gas from the tube in order to vary the gas pressure in its interior to counteract the detected diameter changes and/or to prevent such changes from occurring as a result of variations in the main-flow rate of the entering gas stream.

Pursuant to a more particular feature of my invention, the extraction-controlliing chamber has a generally horizontal inlet connected to the second conduit means and an upwardly converging passage terminating at its restricted exit aperture, this passage separating residual reactants in the form of entrained solids from the carrier gas leaving the tube.

The monitoring means designed to detect incipient changes in the outer tube diameter may comprise a photoelectric transducer displaceable jointly with the heating means relatively to the tube in axial direction thereof so as to remain trained upon a zone of maximum temperature.

BRIEF DESCRIPTION OF THE DRAWING

The above and other features of my invention will now be described in detail with reference to the accompanying drawing in which.

SPECIFIC DESCRIPTION

Figure 1:
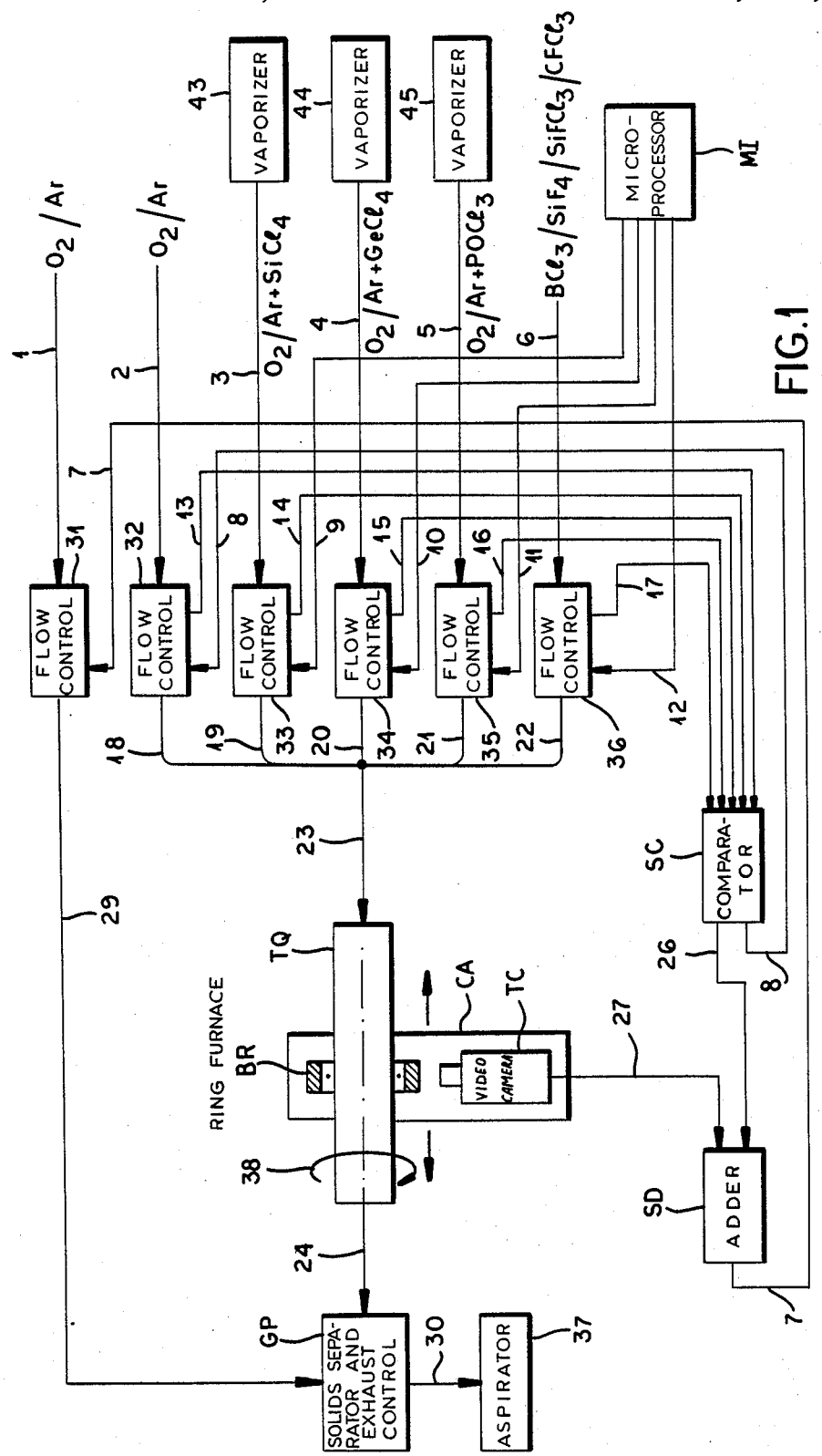
FIG. 1 is a block diagram schematically illustrating an apparatus according to my invention.

As shown in FIG. 1, a carriage CA is reciprocable along the axis of a quartz tube TQ which is held by rotatable mounting means schematically represented by an arrow 38. Carriage CA supports a ring furnace BR which intensely heats an annular zone of tube TQ, gradually shifting from one end of the tube to the other, in an arrangement similar to that shown in the aforementioned commonly owned application Ser. No. 390,801. Tube TQ is traversed, in the same general manner as in the system of that pending application, by a gas mixture entering it through a conduit 23 with a number of branches 18-22 to which different constituents of that mixture are being continuously supplied under the control of a microprocessor MI. Another conduit 24 extends from an outlet end of tube TQ to a container GP acting as a solids separator and exhaust controller in a manner more fully described hereinafter. Container GP further receives an additional gas flow via a third conduit 29.

Several supply lines 1-6 are respectively coupled with conduit 29 and branches 18-22 via respective flow controllers 31-36 which are responsive to commands arriving over respective signal lines 7-12. Flow controllers 32-36 also have metering functions and supply signals proportional to flow rate by way of respective lines 13-17 to a manually settable threshold comparator SC which has one output connected to the line 8 terminating at the control input of flow meter 32. Another output of comparator SC is connected through a lead 26 to an adder SD which has a second input linked via a lead 27 to an output of a video camera TC mounted on carriage CA to monitor the outer diameter of tube TQ in the immediate vicinity of ring furnace BR. Adder SD has its output connected to the lead 7 which terminates at flow controller 31. Lines 9-12 supply rate-changing commands from microprocessor MI to the control inputs of flow meters 33-36. A discharge duct 30 extending from container GP is maintained at a constant low pressure by an aspirator 37 connected therewith in order to exhaust spent gases from tube TQ via conduit 24.

In the specific instance indicated in FIG. 1, the reactants fed into conduit 23 include silicon chloride $SiCl_4$, germanium chloride $GeCl_4$ and phosphorous oxychloride $POCl_3$ which are supplied in gaseous form from respective vaporizers 43, 44 and 45, together with a carrier gas, to lines 3, 4 and 5. There may also be added one or more gaseous halides, such as $BCl_3$, $SiF_4$, $SiFCl_3$, $CFCl_3$, supplied to line 6. Carrier gas, such as oxygen or argon, is further delivered in pure form to conduit 29 via line 1 and to branch 18 via bypass line 2. The temperature of the annular zone heated by ring furnace BR may be above 1600° C. The gas pressure prevailing in upstream conduit 23 may normally be about 2.8 millibars above ambient pressure; the corresponding value for downstream conduit 24 and additional conduit 29 may be about 2.5 millibars.

When microprocessor MI changes the proportional contribution of any of the constituent gas streams under its control, comparator SC responds to the resulting variation in the mass-flow rate and causes flow meter 32 to modify the supply of the supplemental carrier in bypass path 2, 18 so as to keep that rate substantially constant. Adder SD continuously compares the sum of signal voltages on leads 26 and 27 with another manually settable threshold. On detecting a voltage change on lead 26 and/or lead 27 respectively signaling a variation in the mass-flow rate of the gas entering the tube TQ or in the outer diameter of the tube as observed by camera TC, component SD emits an error signal causing controller 31 to alter the flow rate of the additional carrier gas entering the container GP by way of conduit 29. This action, which is tantamount to a negative pressure feedback, will prevent or at least minimize a possible change in the outer and therefore also the inner tube diameter due to thermal stresses or to variations in the pressure differential across the tube wall.

Figure 2:
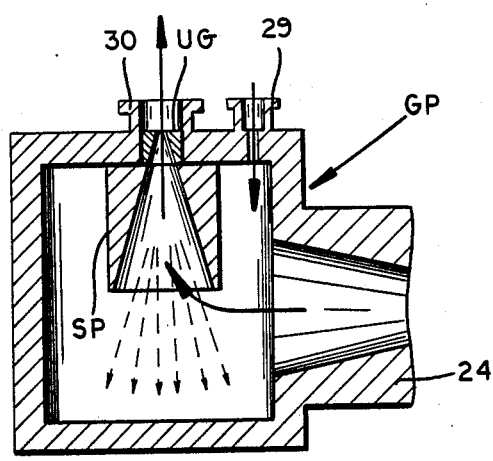
FIG. 2 is a cross-sectional view of a control chamber forming part of the apparatus of FIG. 1.

As more particularly illustrated in FIG. 2, container GP forms a cylindrical chamber centered on a vertical axis and provided with a frustoconically diverging horizontal inlet at an end of conduit 24. This configuration favors a deposition of entrained solid particles on the chamber floor which is located below that inlet. The spent treatment gases entering the container GP through conduit 24 are diverted upward into a nozzle SP with a frustoconically converging passage centered on a vertical axis, this passage terminating at a restricted outlet gate UG whose inner wall surface is flush with that of nozzle SP. The converging nozzle passage causes a progressive acceleration of the gas flow drawn at a constant pressure differential relative to the ambient pressure from the chamber via gate UG and the adjoining conduit 30 by the aspirator 37 of FIG. 1; this acceleration further promotes the separation of entrained particles from the gas on account of their progressively more intense collisions with the peripheral wall surface. The solids thus drop by gravity to the chamber bottom from which they can be evacuated, continuously or intermittently, by means not shown. Such separation could also be accomplished by centrifugal or electrostatic means as is well known in the art.

The additional flow of oxygen or other, inert carrier gas into container GP through an ancillary inlet, communicating with conduit 29, creates a throttling effect at discharge gate UG which allows the rate of extraction of spent gases from tube TQ to be virtually instantly modified under the control of adder SD (FIG. 1) as already described. Video camera TC, which works into adder SD, could be replaced by other photoelectric monitoring means such as, for example, a light source projecting an enlarged image of the outline of tube TQ upon an array of photodiodes so as to indicate changes in the outer tube diameter. A read-only memory could be used to convert the position of a light spot into a numerical value of lead 27.

The relationship between the outer diameter D and internal gas pressure $p_i$ of tube TQ is given by $$p_i = 2\tau \left( \frac{1}{D} + \frac{1}{\sqrt{D^2 - a^2}} \right) \quad (1)$$

where $\tau$ is the surface tension of the quartz and a is the diameter of the tube in its collapsed state. This relationship is not linear so that compensation of incipient changes in diameter D would require the intervention of a rather complex calculator in the circuit controlling the pressure $p_i$. However, with $D \gg a$ and only minor proportional diameter variations $\Delta D/D \ll 1$ to be taken into consideration, the system can be regarded as linear. Thus, differentiation of equation (1) yields $$\left| \frac{\Delta p_i}{p} \right| = \frac{D^3 + \sqrt{(D^2 - a^2)^3}}{(D^2 - a^2) \cdot (D + \sqrt{D^2 - a^2})} \left| \frac{\Delta D}{D} \right| \quad (2)$$

which under the foregoing assumptions becomes $$\left| \frac{\Delta p_i}{p_i} \right| \approx \left| \frac{\Delta D}{D} \right| \quad (3)$$

The compensatory pressure change $\Delta p_i$ can therefore be brought about by simple incremental or decremental adjustment of the throttling action of flow controller 31.

I claim:

1. In a process for making a preform in which a vertical fiber can be drawn, including the steps of:
   (a) passing a plurality of flows of treatment gas including a carrier gas with at least some of the flows being laden with respective vitrifiable reactants in vaporized form, through a vitrious supporting tube for depositing said reactants in successive layers at an elevated temperature on the inner wall surface of said tube; and
   (b) thermally collapsing the resulting structure into a solid rod,
   the improvement wherein:
   (A) the respective gas flows entering said tube are measured;
   (B) the measurements in step (A) are summed and compared with a threshold value to provide an error signal;
   (C) said error signal is used to control one of said flows which does not include any of said reactants to maintain a substantial constant mass flow through said tube;
   (D) the outer diameter of said tube is continuously monitored to produce a signal representing said diameter;
   (E) spent treatment gas is evacuated from said tube into a chamber and is dishcarged through a passage with a restricted exit aperture from said chamber;
   (F) the exhaust rate of the spent treatment gas is modified to vary the gas pressure within said tube in a sense counteracting incipient change in said outer diameter by varying a supply rate of a flow of additional gas into said chamber in response to said signal; and
   (G) said supply rate is further modified in response to changes in said overall mass-flow rate.

2. A process as defined in claim 1 wherein residual reactants entrained by exiting carrier gas in the form of comminuted solid particles are separated from the carrier gas in said passage.

3. A process as defined in claim 1 wherein said additional gas is of substantially the same composition as said carrier gas.

4. A process as defined in claim 1 wherein the gases present in said passage are withdrawn therefrom through said restricted exit aperture under a constant pressure difference relative to ambient pressure.

5. A process as defined in claim 1 wherein the outer diameter of a high-temperature zone of said tube is monitored photoelectrically for generating said control signal.

6. In an apparatus for making a preform from which an optical fiber can be drawn, comprising mounting means for holding a vitreous supporting tube thermally collapsible into a solid rod, first conduit means for introducing a flow of treatment gas including carrier gas laden with vitrifiable reactants in vaporized form into said tube and depositing said reactants in successive layers on the inner wall surface of said tube, heating means for bringing the reactants in said tube to an elevated interaction temperature, second conduit means connected to an outlet end of said tube, and exhaust means coupled with said second conduit means for extracting spent treatment gas from said tube, the combination therewith of a chamber inserted between said second conduit means and said exhaust means, a source of a flow of additional gas connected via third conduit means to said chamber, monitoring means juxtaposed with said mounting means for detecting incipient changes in the outer diameter of said tube, flow-control means in said third conduit means responsive to signals from said monitoring means for varying the flow rate of said additional gas, said chamber having a restricted exit aperture leading to said exhaust means whereby variations in said flow rate modify the rate of extraction of said spent treatment gas from said tube to vary the gas pressure within said tube in a sense counteracting said incipient change, said first conduit means comprising several merging supply lines including a bypass line conveying supplemental gas free from accompanying reactants to said tube, said supply lines being provided with respective metering means measuring the flow rate therethrough, and comparison means connected to all said metering means for generating error signals in response to any deviation of the combined mass-flow rate in said first conduit means from a predetermined reference value, the metering means of said bypass line having a control input connected to said comparison means for varying the flow rate of said supplemental gas in response to said error signals to keep said mass-flow rate substantially constant, said chamber having a generally horizontal inlet connected to said second conduit means and an upwardly converging passage terminating at said exit aperture for separating residual reactants, entrained by exiting carrier gas in the form of comminuted particles, from the mixture of said spent treatment gas with said additional gas in said chamber, said generally horizontal inlet being substantially frustoconical with an enlarged end opening into said chamber above the bottom thereof, adding means being inserted between said monitoring means and said flow-control means, said adding means having an input connected to said comparison means for varying the flow rate of said additional gas also in response to said error signals.

7. The combination defined in claim 6 wherein said monitoring means comprises a photoelectric transducer.

8. The combination defined in claim 7 wherein said transducer is displaceable jointly with said heating means relatively to said tube in axial direction thereof for detecting incipient diameter changes in a zone of maximum temperature.

* * * * *